United States Patent Office 2,716,468
Patented Aug. 30, 1955

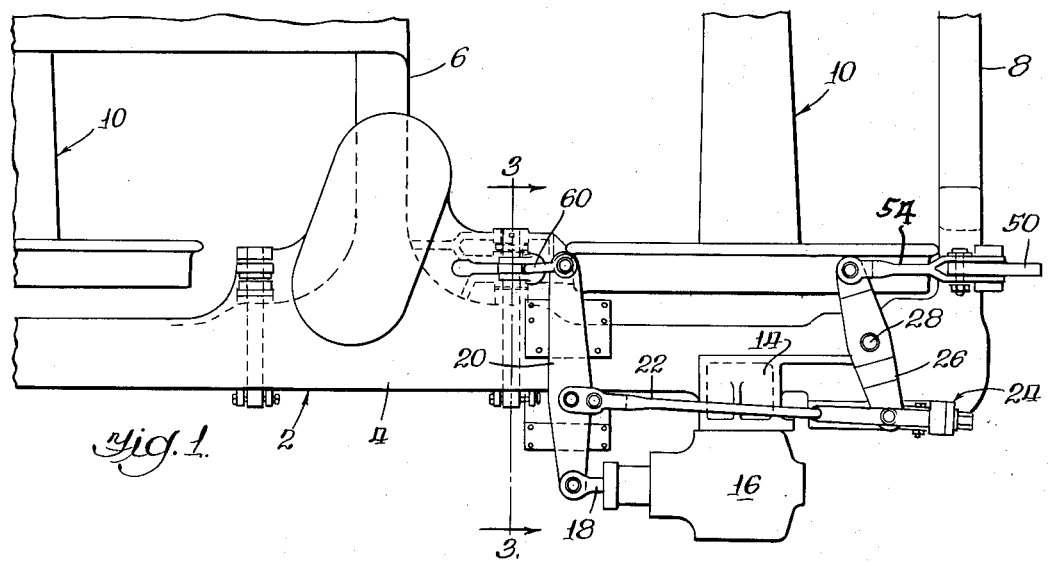
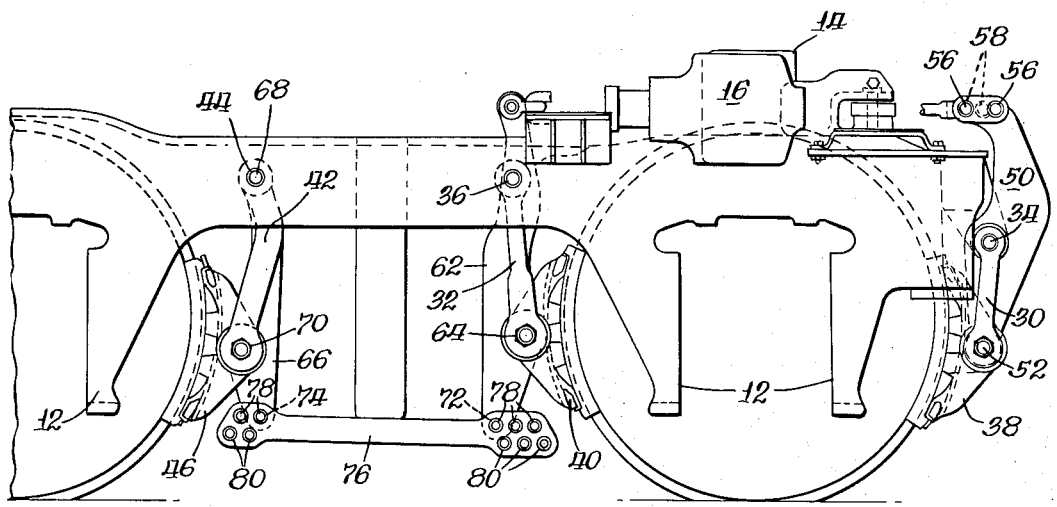
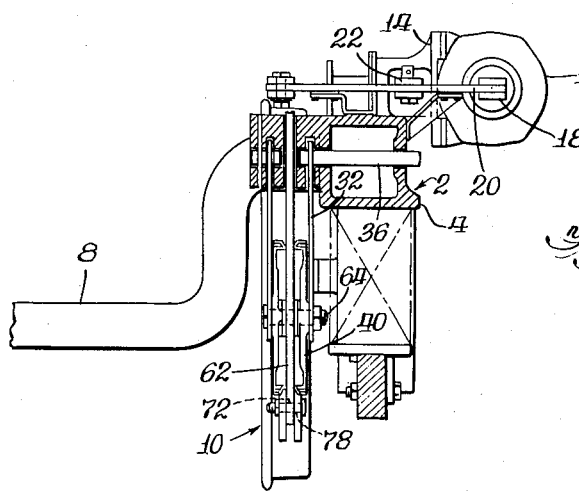

2,716,468

CLASP BRAKES FOR RAILWAY TRUCKS

Edward J. Simanek, Chicago, Ill., assignor to American Steel Foundries, Chicago, Ill., a corporation of New Jersey Application November 12, 1953, Serial No. 391,543

7 Claims. (Cl. 188—56)

The invention relates to railway trucks and more particularly to a novel multiple purpose clasp brake rigging therefor.

Railway trucks currently employed, and particularly that type of truck known as the six-wheel truck, are designed to utilize wheels of different diameters, for example, 40 or 42 inch diameter wheels. For reasons not germane to the present application, a given railway truck user may desire either diameter wheel or may desire to change the diameter wheel employed on a particular truck at any given time. Inasmuch as the wheel and axle assemblies on said railway truck are movably connected to the frame, the particular frame readily accommodates either 40 or 42 inch diameter wheels. A problem arises, however, relative to the brake rigging which is conventionally carried by the frame. To date, each clasp brake rigging was designed to operate with a given diameter wheel and a change in wheel diameter rendered the operation of a particular rigging unsatisfactory. The reasons for such unsatisfactory operation will be readily appreciated by those skilled in the art in view of the fact that actuating piston travel is virtually constant to produce a satisfactory braking pressure and a change in wheel diameter causes a change in the distance through which the shoe operation brake lever must move.

Accordingly, it is a general object of the invention to design a clasp brake rigging that can be selectively operated with a plurality of wheel diameters.

It is a further object of the invention to provide a rigging, as described, wherein a constant piston movement will afford required braking pressure regardless of the wheel diameter employed on the truck.

It is a specific object of the invention to provide selectable variable connections in the brake rigging to afford the characteristics above described.

These and other objects of the invention will become apparent from an examination of the following specification and the accompanying drawing, wherein:

Figure 1 is a fragmentary plan view of one-quarter of a six wheel railway car truck employing the invention, Figure 2 is a fragmentary side elevational view of the structure shown in Figure 1, and Figure 3 is a sectional view taken along line 3—3 of Figure 1.

Describing the invention in detail, the railway truck consists of a frame 2 having side rails 4 and interconnecting transom members 6 and 8, the transom member 8 being denominated an end rail. The truck illustrated employs three wheel and axle assemblies, indicated generally at 10, the central and one end assembly only being shown. The wheel and axle assemblies 10 support in the conventional manner (not shown) the frame 2, said frame having depending pedestal jaws 12 which movably receive journal boxes (not shown) associated with the wheel and axle assemblies.

In the right-hand corner of the frame 2, and on the outboard side thereof, a bracket 14 offers convenient mounting for an operating air cylinder 16, said cylinder having a piston rod 18 extending from one side thereof, said piston rod being horizontally movable in response to actuation of the cylinder 16 in the conventional manner such as, for example, by the introduction of air pressure to said cylinder.

The cylinder 16 is operatively connected to a brake rigging and particularly to the outboard end of a live actuating lever 20, said actuating lever having a connection intermediate its ends to a pull rod 22 which extends longitudinally of the truck. The pull rod 22 is provided with an adjusting mechanism indicated generally at 24, said pull rod also being connected to the outboard extremity of a dead actuating lever 26 which in turn is pivoted to the frame at 28.

A pair of brake hangers 30, 32, having their upper ends pivoted to the frame at 34 and 36, respectively, carry on the lower ends thereof brake head-brake shoe assemblies 38 and 40. The brake shoe assemblies 38 and 40 embrace the related wheel and under the action hereinafter described engage or clasp the tread of said associated wheel in order to decelerate the truck. Additionally, another brake hanger 42, having its upper end fulcrumed to the frame as at 44 carries on the lower end thereof another brake head-brake shoe assembly 46, said assembly 46 being engageable with the tread of the associated wheel. At this point, it should be understood that the brake rigging illustrated is duplicated in the other quadrants of the truck whereby each wheel is provided with brake head-brake shoe assemblies to clasp the tread thereof.

Directing attention to the right hand end of the truck, it will be seen that a dead brake lever 50 is provided having its lower end pivotally connected as at 52 to the related brake shoe assembly 38, said dead brake lever 50 being fulcrumed to the frame intermediate the ends thereof as at 34. A push rod 54 is provided to interconnect the inboard end of the dead actuating lever 26 with the upper end of the dead brake lever 50. It should be noted that the end of the push rod connected to the brake lever is provided with a pair of horizontally spaced holes 56, 56 and that the upper end of the dead brake lever 50 is also provided with a pair of horizontally spaced holes 58, 58, and that the spacing between the brake lever holes is substantially less than the spacing between the push rod holes. The plurality of holes on the push rod 54 and upper end of the dead brake lever 50 provides a selectable variable connection between the push rod 54 and brake lever 50, whereby the released position of the brake lever 50 relative to the axis of rotation of the associated wheel may be varied by the expedient of changing the pin connection between the push rod holes and brake lever holes. It should also be noted that spaced holes in the push rod alone would not satisfy the requirements of the invention by reason of the fact that the take up in the push rod would not accurately reposition the dead brake lever 50 to accommodate the change in associated wheel diameter, it being impossible to accommodate two holes in the push rod without overlapping same.

The inboard end of the live actuating lever 20 is link or clevis connected as at 60 to the upper end of a live brake lever 62, said live brake lever 62 being fulcrumed intermediate its ends as at 64 to the associated brake head-brake shoe assembly 40. A second dead brake lever 66 is provided adjacent the central wheel, said brake lever 66 being fulcrumed at its upper end as at 68 to the frame 2 and pivotally connected intermediate its ends as at 70 to the associated brake head-brake shoe assembly 46.

It will be noted that the live brake lever 62 and dead brake lever 66 extend a substantial distance below the related brake shoe assembly and are provided at their lower ends with pivot holes 72 and 74, respectively. A connecting strap 76 provides selectable variable connections at the opposite ends thereof to the lower end of the live brake lever 62 and the lower end of the dead brake lever 66, respectively. It will be noted that the opposite ends of the connecting strap 76 are provided with vertically spaced horizontally offset pairs of holes 78 and 80. It will be noted that the holes 78 at the opposite ends of the strap are utilized to take up slack in the rigging as the associated brake shoe assemblies 40 and 46 wear in service, while the holes 80 are utilized to reposition the brake levers 62 and 66 to accommodate a change in the diameter of the associated wheel. It will be noted that the holes 80 are horizontally offset from their related holes 78 approximately the radius of said holes and that all of said holes 78 and 80 are of equal diameter.

The arrangement shown in the drawing illustrates the brake rigging in proper position to engage the tread of 42 inch diameter wheels. When it is desired to incorporate 40 inch diameter wheels with the illustrated truck, the pin connection between the push rod 54 and the brake lever 50 is made between the outboard hole 58 on the brake lever 50, and the outboard hole 56 on the push rod 54 and the pin connection is made between the strap 76 and the brake lever 62 between the hole 72 on said brake lever and the lower left-hand hole 80 of said strap. Additionally, the pin connection between the brake lever 66 and strap 76 is made between the hole 74 of the brake lever and the lower right-hand hole 80 of the strap 76. These various connections assume a no wear condition in the associated brake head-brake shoe assemblies.

I claim:

1. In a brake arrangement for a railway car truck, wheel and axle assemblies, a frame supported thereby, a dead brake lever pivoted to the frame friction, means carried by the lower end of the dead lever and engageable with the tread of one of the wheels and on one side thereof, a brake hanger pivoted to the frame and carrying friction means on the lower end thereof engageable with the tread on the opposite side of said one wheel, another dead brake lever having its upper end pivoted to the frame, a live brake lever positioned intermediate said dead brake levers, friction means carried by said other dead brake lever intermediate its ends and engageable with the tread of another wheel adjacent the first mentioned wheel, power means mounted on the frame, a live actuating lever having one end thereof connected to the power means, a connection between the other end of the actuating lever and the upper end of the live brake lever, a dead actuating lever pivoted to the frame, a pull rod interconnecting the outboard end of the dead actuating lever and a central portion of the live actuating lever, a push rod connected to the inboard end of the dead actuating lever, the upper end of the first mentioned dead brake lever and the push rod each having a plurality of pin holes therein offering variable and vertically selectable pin connections therebetween, pin holes in the lower ends of said live brake lever and second mentioned dead brake lever, and a connection strap having a plurality of vertically selectable pin holes in the opposite ends thereof for variably interconnecting the lower ends of said live brake lever and second mentioned dead brake lever.

2. In a brake arrangement for a railway car truck having wheel and axle assemblies, a frame supported thereby, a frame supported power source, friction means positioned on opposite sides of and engageable with one of said assemblies, other friction means positioned on one side of and engageable with another of said assemblies adjacent said first mentioned assembly, and brake hangers pivoted to the frame and carrying said friction means; the combination of a dead brake lever connected at its lower end to one of said first mentioned friction means, another brake lever being connected intermediate its ends to said second mentioned friction means, a live brake lever positioned intermediate said first and second mentioned brake levers and connected intermediate its ends to another of said first mentioned friction means, a strap having a plurality of vertically and horizontally spaced selectable pin holes in opposite ends thereof for variably interconnecting the lower ends of said second and third mentioned brake levers, a live actuating lever having at one end thereof an operative connection with the power source and at the other end thereof an operative connection with the live brake lever, a dead actuating lever having at one end thereof an adjustable operative connection with said first mentioned brake lever, and a rod connecting the live actuating lever intermediate its ends to one end of the dead actuating lever.

3. In a brake arrangement for a railway car truck having a frame and including wheel and axle assemblies, said assembly comprising two adjacent wheels on one side of the truck; the combination of a pair of brake levers disposed on opposite sides of one of said wheels, the brake lever on the outboard side of said one wheel being a dead lever and the brake lever on the inboard side of said wheel being a live lever, another dead brake lever adjacent the other of said wheels, friction assemblies on each of said brake levers for engagement with the related wheel upon actuation of the levers, power means on the frame, and brake rigging connecting the power means to the brake levers, said rigging comprising live and dead actuating levers operatively interconnected and connecting the brake levers, a selectable vertically variable connection to the first mentioned dead brake lever, and a strap having selectable variable connections to the live brake lever and second mentioned dead brake lever, respectively, said selectable variable connections being operative to vary the released position of the friction assemblies with respect to the axis of rotation of the related wheels to selectively accommodate wheels of different diameters.

4. In a brake arrangement for a railway car truck having spaced wheel and axle assemblies, a frame supported thereby, friction means associated with said assemblies, and a frame mounted power source; a brake linkage connecting said friction means to said power source, said linkage comprising a pair of actuating levers, one of said levers being a live lever operatively connected to said power source, the other of said levers being a dead lever operatively connected to the live actuating lever, a pair of brake levers operatively connected to said actuating levers and connected to friction means engageable with certain of the wheel and axle assemblies, one of said brake levers being a dead lever and the other a live lever, another brake lever positioned adjacent said live brake lever and connected to friction means engageable with another of the wheel and axle assemblies, brake hangers pivoted to the frame and carrying said friction means, and a strap having a plurality of vertically selectable pin holes in the opposite ends thereof for adjustably connecting the lower ends of said live brake lever and said second mentioned dead brake lever.

5. In a brake rigging for a railway car truck, a frame, wheel and axle assemblies having adjacent wheels, a hanger pivoted to the frame and carrying a first brake shoe assembly on the lower end thereof engageable with the tread of one wheel, a second hanger pivoted to the frame and carrying on the lower end thereof a second brake shoe assembly engageable with the tread of the other wheel, a generally vertical live brake lever pivoted intermediate its ends to the first brake shoe assembly, a dead brake lever fulcrumed to the frame and pivoted intermediate its ends to the second brake shoe assembly, a strap having selectable vertically variable connections at opposite ends thereof to the lower ends of said brake levers, and power means operatively connected to the live brake lever.

6. A brake rigging for a railway car truck according to claim 5, wherein said selectable variable connections consists of holes in the lower end of the brake levers, and pairs of vertically spaced horizontally offset holes in the opposite ends of the strap, said holes being selectively connectable by pins.

7. A brake rigging for a railway car truck according to claim 6, wherein said holes are circular and of substantially equal diameter and the centers thereof are horizontally offset less than the diameter thereof.

References Cited in the file of this patent

UNITED STATES PATENTS

| | | |
|---|---|---|
| 2,148,363 | Aurien | Feb. 21, 1939 |
| 2,159,366 | Baselt | May 23, 1939 |
| 2,343,940 | Tack | Mar. 14, 1944 |
| 2,494,280 | Baselt | Jan. 10, 1950 |
| 2,508,211 | Aurien | May 16, 1950 |